US006631810B1

(12) United States Patent
Lamas et al.

(10) Patent No.: US 6,631,810 B1
(45) Date of Patent: Oct. 14, 2003

(54) SEALING ARRANGEMENT FOR A PULP DEWATERING ARRANGEMENT

(75) Inventors: Axel Lamas, Karlstad (SE); Bo Clarstrom, Kil (SE); Stefan Hansson, Ankarsvik (SE)

(73) Assignee: Kvaerner Pulping AB, Karlstad (SE)

( * ) Notice: Subject to any disclaimer, the term of this patent is extended or adjusted under 35 U.S.C. 154(b) by 56 days.

(21) Appl. No.: 10/018,679

(22) PCT Filed: Jun. 7, 2000

(86) PCT No.: PCT/SE00/01172

§ 371 (c)(1), (2), (4) Date: Mar. 6, 2002

(87) PCT Pub. No.: WO00/79039

PCT Pub. Date: Dec. 28, 2000

(30) Foreign Application Priority Data

Jun. 18, 1999 (SE) .............................................. 9902308

(51) Int. Cl.[7] ....................... B01D 33/06; B01D 33/067; B01D 33/37; D21C 9/06; D21C 9/18

(52) U.S. Cl. ....................................... 210/402; 210/326

(58) Field of Search ................................. 210/402, 326

(56) References Cited

U.S. PATENT DOCUMENTS

| | | | | |
|---|---|---|---|---|
| 2,741,369 | A | * | 4/1956 | Fest |
| 3,772,144 | A | * | 11/1973 | Luthi et al. |
| 3,980,518 | A | * | 9/1976 | Ljung et al. |
| 4,085,003 | A | * | 4/1978 | Luthi |
| 4,750,340 | A | * | 6/1988 | Anderson |

* cited by examiner

*Primary Examiner*—Thomas M. Lithgow
(74) *Attorney, Agent, or Firm*—Rolf Fasth; Fasth Law Offices

(57) ABSTRACT

The arrangement is for washing and dewatering a fiber pulp suspension. The arrangement comprises two hollow, circular-cylindrical screen members that have evacuation chambers arranged inside the screen members for leading off liquid. The screen members rotate counter to each other to form a nip. At least one of the screen members is arranged in a trough that partially encloses the jacket of the screen member and, in the direction of rotation of the screen member, converges towards the jacket of the screen member. A sealing arrangement for a pulp head box distributes the pulp onto the jacket surface of the screen members. By forming a progressively decreasing gap B-A at the pulp head box counter to the rotation of the screen member, a simple self-sealing of the pulp suspension can be obtained which allows fiber residues to be returned to the dewatering zone.

7 Claims, 2 Drawing Sheets

SEALING ARRANGEMENT FOR A PULP DEWATERING ARRANGEMENT

PRIOR APPLICATIONS

This application is a U.S. national phase application based upon International Application No. PCT/SE00/01172, filed Jun. 7, 2000; which claims priority from Swedish Application No. 9902308-7, filed Jun. 18, 1999.

TECHNICAL FIELD

The present invention relates to a sealing arrangement for a pulp dewatering arrangement.

BACKGROUND AND SUMMARY OF THE INVENTION

In production of paper pulp from cellulose-containing fibre material, it is necessary to wash and dewater the paper pulp at several stages in the process. A previously known and commonly used arrangement for washing and dewatering of paper pulp, called a wash press, is described in SE-C-380,300, SE-C-501,710, U.S. Pat. No. 5,488,900 and SE-C-504,011. The arrangements disclosed in these documents comprise two cylindrical rotatable screen members arranged in an essentially convergent trough. Other examples of known arrangements are disclosed in U.S. Pat. No. 4,543,161 and in U.S. Pat. No. 5,667,642, the last-mentioned representing an arrangement in which the screen members rotate in the opposite direction to the usual one, i.e. the right screen member rotates counter-clockwise and the left screen member rotates clockwise, as viewed from the side.

A problem encountered in washing and dewatering with wash presses of the abovementioned type is that fibre residues can remain on the drum after the washed and dewatered fiber mat has been removed. To flush these fiber residues away and to clean the holes in the screen members, spray pipes are used, for example those shown in U.S. Pat. No. 4,861,433, where the spray pipes flush the exposed surface of the cylindrical rotatable screen members after the washed and dewatered fibre mat has been scraped off by a doctor blade. In wash presses with 180 degrees coverage of the pulp web, the flushing takes place on the downwardly moving part of the drum, which means that the spray water and flushed-off fibre residues can run off. This has functioned satisfactorily, and repeated shutdowns for cleaning are not required. These spray pipes have shortcomings in their flushing capacity in high-power wash presses with longer dewatering paths of 270 degrees coverage, where pulp for dewatering is applied at the highest point of the drum and dewatered pulp is removed at the press nip between two drums. In such constructions, the spray water and the flushed-off fibre residues cannot run off along the drum naturally, since this flow would run back down towards the dewatered pulp. This means that fibre residues are continuously accumulated on the surface of the screen members against the pulp headbox until the wash press is buried.

This accumulation of fibre residues means that the wash press has to be cleaned at regular intervals. Examples of sealing arrangements on the pulp headbox are shown in U.S. Pat. No. 3,980,518 and SE-B-504,011. SE-B-503,010 shows a variant with resilient steel bands whose purpose is to allow pressurization of the pulp area and compatibility with wire cloths. Adjustment of the seal is said to be simple, as is its replacement when so required. The wear and tear on this type of seal is extensive and it needs to be replaced at more or less regular intervals.

One object of the present invention is to avoid the problems with known sealing arrangements in the headboxes of wash presses and to make available a wash press with improved sealing of the pulp headbox, which sealing can be easily adjusted depending on the pulp concentration in question and the pressure of the pulp in the pulp headbox.

Another object is to make available a wash press with improved sealing of the pulp headbox, which sealing allows fibre residues remaining on the surface of the circular screen members to pass the seal and onwards into the dewatering zone. This prevents fibre residues from accumulating against the sealing strip and instead being drawn into the dewatering or press area again. No pile of accumulating fibre residues builds up against the seal, which fibre residues otherwise lead to increased wear of the screen plate. The wash press can therefore be operated for longer periods of time without unnecessary stops for cleaning, and it is possible to dispense with complicated cleaning arrangements.

Yet another object is to make available a wash press with improved sealing of the pulp headbox, which seal itself is exposed to minimum continuous wear, and the wear on cooperating screen members is reduced to a minimum.

Yet another object is that the primary seal is achieved by the fact that a dynamically sealing plug with progressively increasing concentration of pulp is formed in the sealing gap. The dynamically sealing plug is also able to adapt continuously to changes in the sealing gap caused by the gap-forming plate changing position or the screen member springing aside. The dynamic effect is achieved by the fact that outflowing pulp along the lip is continuously thickened, turns and follows the screen plate back into the press again. The dynamic effect ensures that the loads and the wear which would otherwise be developed by a stationary fibre plug against the screen plate can be greatly reduced.

BRIEF DESCRIPTION OF THE DRAWINGS

The invention will be described below with reference to the figures, in which.

DETAILED DESCRIPTION

Figure 1:
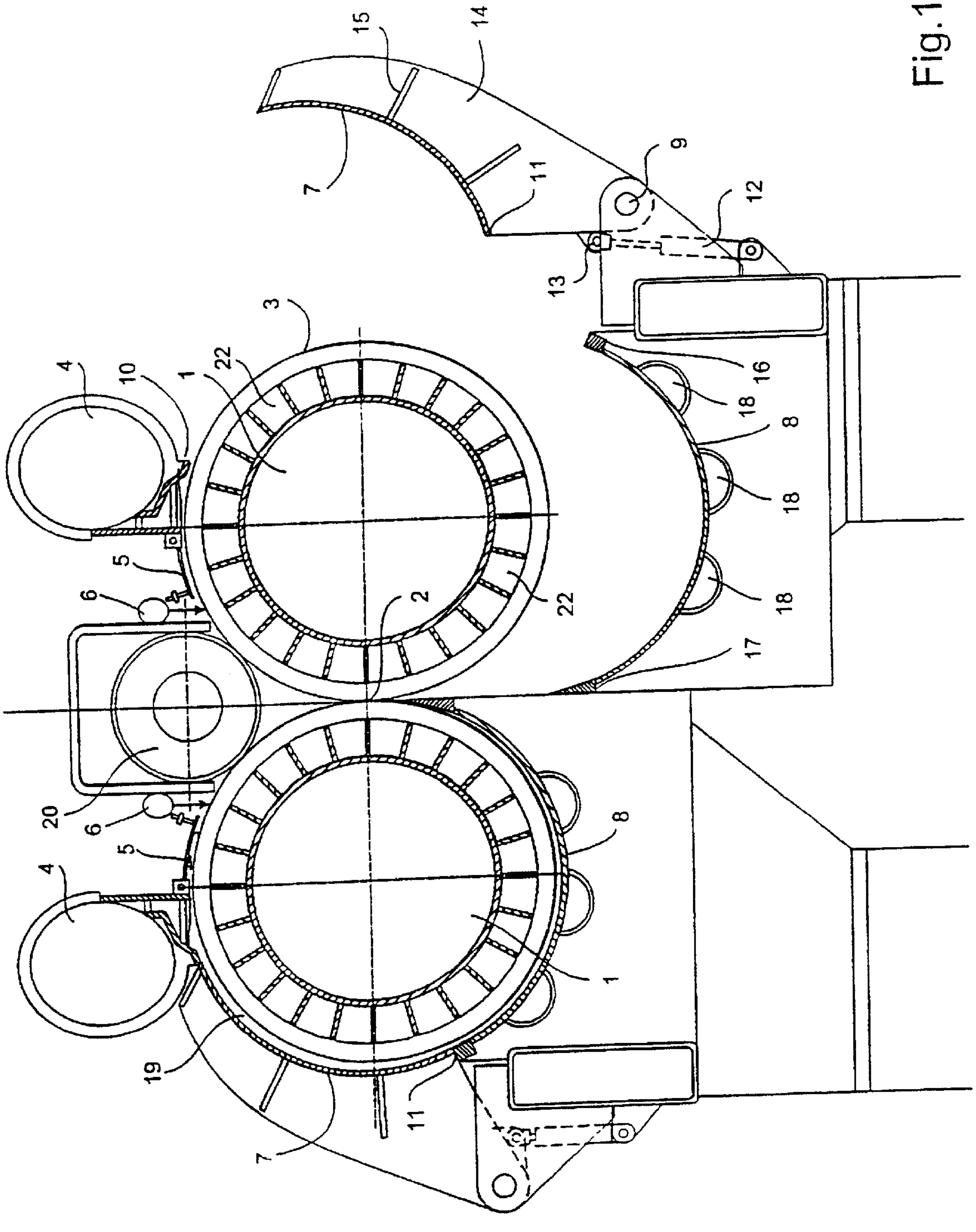
FIG. 1 shows a sealing arrangement according to the invention implemented in a wash press, seen in cross-section.

The type of wash press in which the sealing arrangement according to the invention is used is shown in FIG. 1 and comprises two hollow, circular-cylindrical screen members 1 which comprise a number of evacuation chambers under the jacket surface of the screen member for leading off evacuated liquid. The two screen members form a press nip 2 between each other and are arranged to rotate counter to each other, where, as viewed from the side, the right screen member rotates clockwise and the left screen member rotates counterclockwise. Since the arrangement is essentially symmetrical in a plane of symmetry that is formed by a tangent to the screen member 1 in the nip 2, only one symmetrical part will continue to be described hereinafter.

The screen member 1 preferably has a diameter of 1.0 to 2.5 meters. Its jacket 3 is further perforated to allow liquid to be evacuated from a fibre pulp web lying on the jacket surface and onwards into individual evacuation chambers 22 which carry evacuated liquid off axially into the screen member. The evacuation chambers 22 communicate with each other by means of the fact that channels running in the circumferential direction are formed between supports (not shown) arranged directly under the screen plate bearing against the axially directed evacuation chambers.

In the preferred embodiment shown in FIG. 1, a pulp headbox 4 is arranged on each screen member 1. Each pulp headbox 4 is arranged at 0° on the screen member, where 0° constitutes the highest/uppermost point of the screen member and degrees increase positively in the direction of rotation of the screen member. Incoming paper pulp, which normally has a concentration of about 1–12%, preferably 3–10%, is distributed by means of the headbox uniformly along the length of the screen member.

In the preferred embodiment shown in FIG. 1, there is also a trough which, for each screen member 1, consists of at least two trough sections 7, 8 which can be pivoted via shafts 9 by means of a hydraulic cylinder 12.

The screen members 1 are arranged to rotate at a speed of 5–20 rpm by means of a suitable drive mechanism. Paper pulp follows the rotation of the screen members into the gap 19 between the perforated jacket surface 3 and the walls of the trough 7, 8, where it forms a fibre pulp web which is dewatered by virtue of the fact that the gap converges in the direction towards the nip. The liquid which is pressed out of the fibre pulp web is led off (not shown) from the arrangement. In the wash zones 18, where the gap can be slightly diverging, washing liquid is introduced into the fibre pulp web, and the latter is washed. Finally, the fibre pulp web is dewatered by the pressure in the nip 2 to a concentration which is about 5–20 times higher than the concentration of the incoming paper pulp, for example 1–12% on entry and 25–40% after the nip. The fibre pulp web is torn off from the jacket 3 and is led off from the arrangement with the aid of the stripper and the conveyor screw 20.

Figure 2:
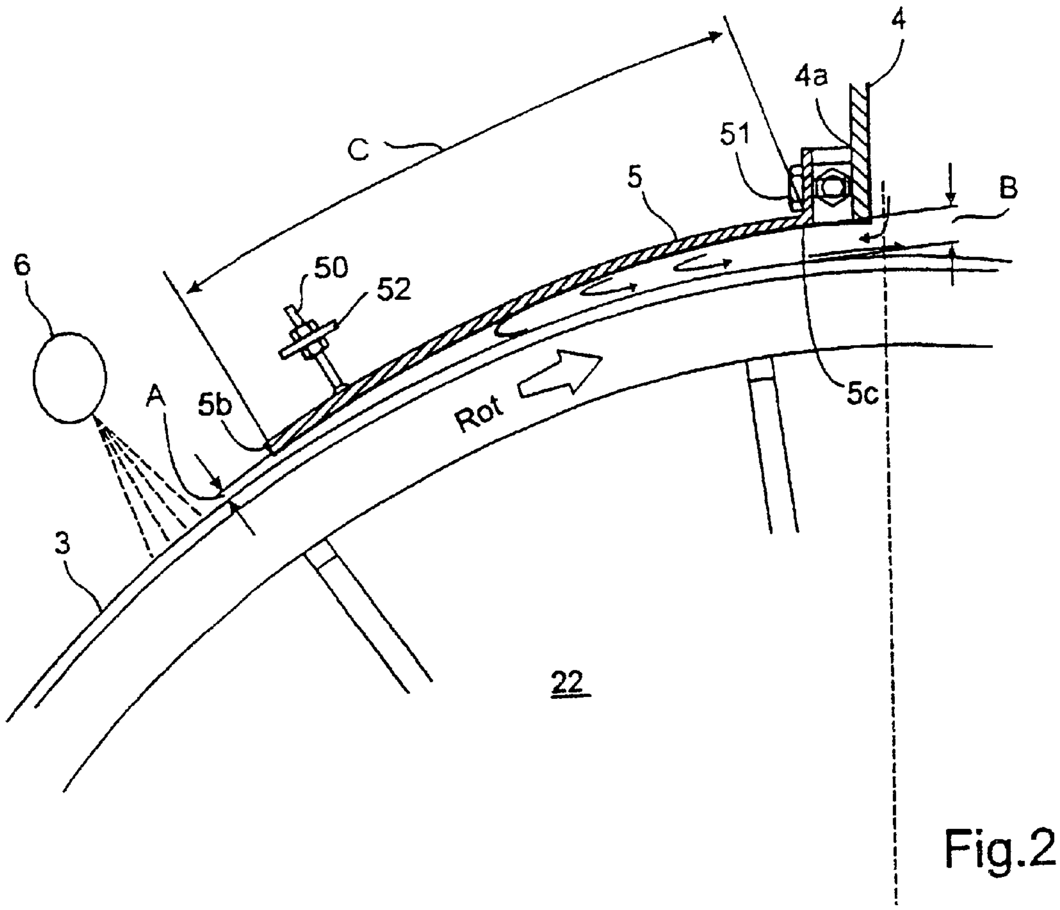
FIG. 2 shows the sealing arrangement according to the invention on a larger scale.

During operation, a paper pulp having a concentration of about 1–12% is led into the gap 19 via the pulp headbox 4. The invention is now described in more detail with reference to FIG. 2 that shows the main features of the invention. The pulp headbox 4 distributes the pulp over the whole width of the wash press in a manner known per se using a distributor screw corresponding to that shown in U.S. Pat. No. 4,559,104. Arranged at the rear edge of the headbox 4 directed counter to the direction of rotation of the screen member there is, according to the invention, a seal-forming plate shroud 5 which on its outer edge 5*b* is arranged at a distance A from the surface of the screen member. The inner edge 5*c* is secured to the pulp headbox 4 by any suitable fastening means, for example a sealing bolt connection 51, welding or in another way.

The plate shroud 5 has a circumferential extent over the screen member exceeding the primary dimension B between the surface of the screen member and the inside of the plate shroud at its inner edge 5*c*. The free length C of the plate shroud should lie in the range of at least 2–20 times the length of the primary dimension B, preferably 10 times this. In application with pulp concentrations of around 10% and a primary dimension of about 30 mm, a very good sealing function is obtained for a free length C of the plate shroud of about 300 millimetres.

To be able to easily adapt the sealing function of the plate to the pulp pressure and pulp concentration, where increasing pulp pressure and falling pulp concentration require a smaller distance A, an adjusting member 50 is preferably provided acting on the outer edge of the plate shroud. This adjusting member 50 can consist, for example, as shown in the figure, of a single clamping screw which is arranged on a bracket 52 secured in the stand of the wash press.

The sealing function of the sealing arrangement 5 is obtained by means of a controlled leakage flow being formed under the plate 5 as a function of the size of the gap B. As the flow of the pulp suspension into the gap is counter to the rotation of the screen member, a continuous dewatering against the jacket surface of the screen member is obtained. By means of this continuous dewatering, the pulp suspension under the plate shroud 5 forms a self-sealing plug which prevents further leakage past the outer edge 5*b*.

If, despite everything, a leakage is observed, this is countered by decreasing the gap A with the adjusting member 50.

In a conventional manner there can also be sprays 6 for flushing away fibres which may have accumulated on the screen arrangement.

Figure 3:
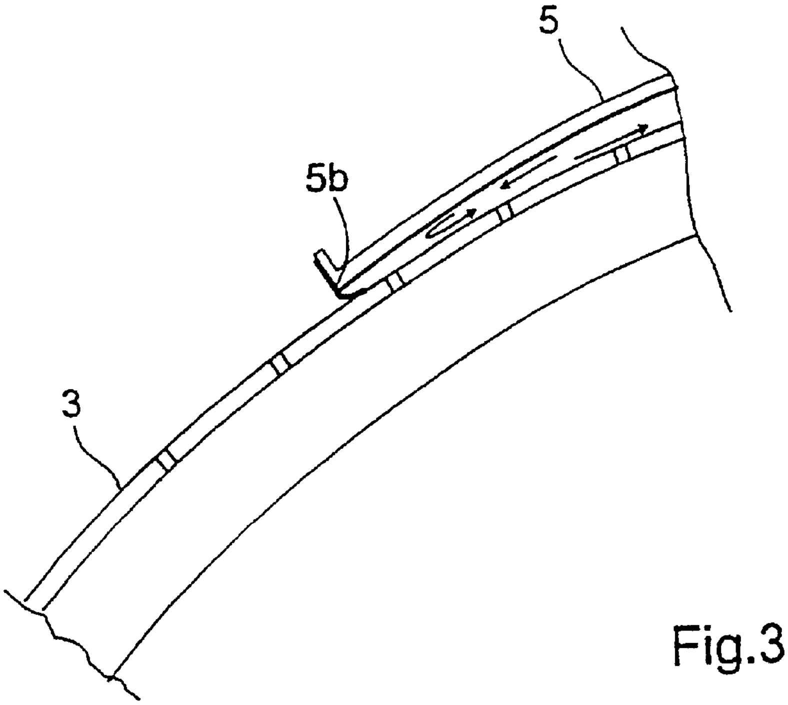
FIG. 3 shows a detail of a variant of the sealing arrangement according to the invention.

The arrangement according to the invention is not limited to the embodiments described above, and instead can be varied within the scope of the attached patent claims. For example, the outer edge 5*b* of the plate shroud can be provided with a small sealing rubber strip, see FIG. 3, which can be useful when using the wash press with very low pulp concentrations. Such a sealing arrangement can also be formed in such a way that it can be pivoted aside after a start-up procedure where the sealing strip is only initially required to build up the sealing pulp plug. Such a pivotable strip can simply be arranged on a hinge-like structure (not shown).

The adjusting arrangement 50 can also be replaced by a servo mechanism which automatically adjusts to the plug formed. Automatic adjustment of this type can also be provided, for example, by re-coupling the necessary setting force, where a setting force above a certain level indicates that the sealing plug has been able to form.

Alternatively, the dimension A can be adjusted as a function of operating time, where a minimum gap A is set during start-up, with the gap progressively increasing until the desired gap size has been reached.

While the present invention has been described in accordance with preferred compositions and embodiments, it is to be understood that certain substitutions and alterations may be made thereto without departing from the spirit and scope of the following claims.

What is claimed is:

1. An arrangement for washing and dewatering a fiber pulp suspension, comprising:

- a first circular-cylindrical screen member in rotatable operative engagement with a second circular-cylindrical member to form a nip, the first member being rotatable in a first direction and the second member being rotatable in a second direction opposite the first direction;
- the first screen member being disposed in a trough that partially encloses a casing of the first screen member, the trough converging towards the casing in the first rotational direction of the first screen member;
- a pulp headbox box arranged at the first screen member for introducing pulp to the casing and the trough for forming a fiber pulp web, the pulp headbox having a sealing arrangement arranged between the pulp headbox and the first screen member;

the sealing arrangement having a sealing surface with a progressively decreasing gap defined between the pulp headbox and the first screen member in a direction opposite to the first rotational direction of the first screen member, the gap, at an inner edge of the pulp headbox, corresponding to a first dimension (B), and the gap, at an outer edge of the pulp headbox, corresponding to a second dimension (A), the gap having a circumferential portion extending over the first screen member exceeding the dimension (B) by at least two times.

2. The arrangement according to claim 1, wherein the sealing arrangement is made of a thin-walled element that has a circumferential extension that is 2 to 20 times greater than the dimension (B).

3. The arrangement according to claim 1 wherein the dimension (A) corresponds to 10–90% of the dimension B.

4. The arrangement according to claim 1 wherein the dimension (A) is less than 50% the dimension B.

5. The arrangement according to claim 1 wherein the dimension (A) corresponds to a gap that is about 5–10 millimeter for feeding pulp concentrations of about 10–12%.

6. The arrangement according to claim 1 wherein the sealing arrangement is made of a thin-walled element in which the dimension (A) is adjustable by means of an adjusting arrangement for adapting the dimension (A) to a prevailing pulp concentrations and pressure of the pulp in the headbox.

7. The arrangement according to claim 1 wherein the outer edge is provided with an elastic sealing strip that is securely mounted on the outer edge and bridges the dimension (A) so that a free end of the sealing strip bears against the surface of the screen member.

* * * * *